3,514,831
BONDING METHOD AND ARTICLE
Forrest B. Bruch and William C. Hood, Houston, Tex., assignors to Ethylene Gulf Coast Corporation, Houston, Tex., a corporation of Texas
Filed Dec. 6, 1967, Ser. No. 688,520
Int. Cl. B21d 53/10
U.S. Cl. 29—149.5
9 Claims

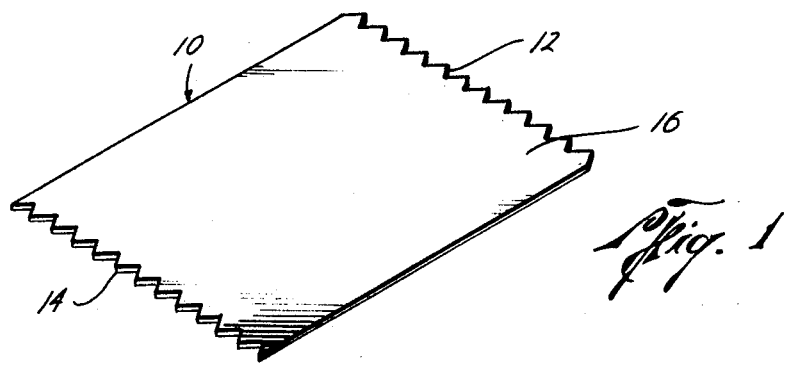
Fig. 1
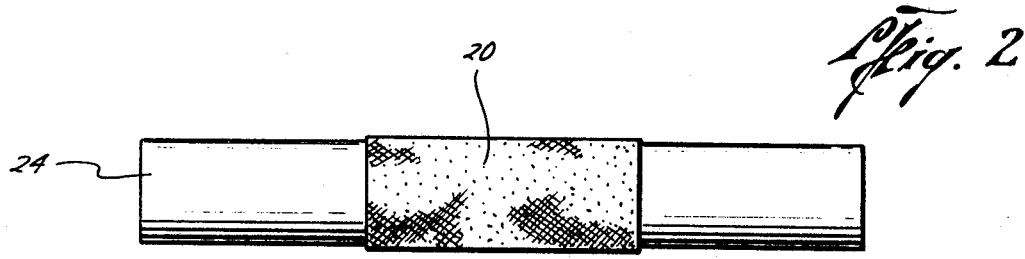
Fig. 2
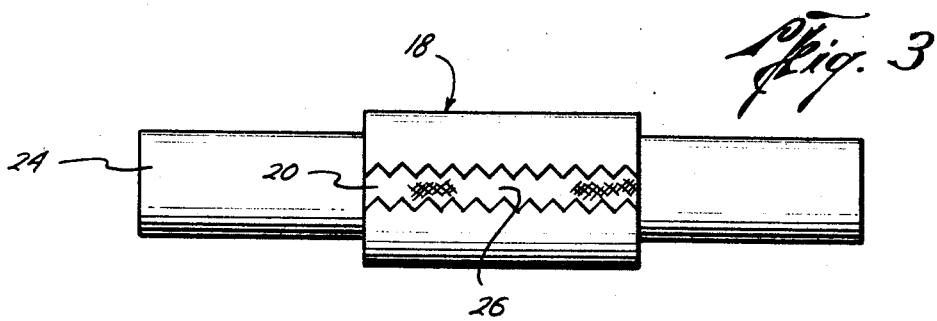
Fig. 3
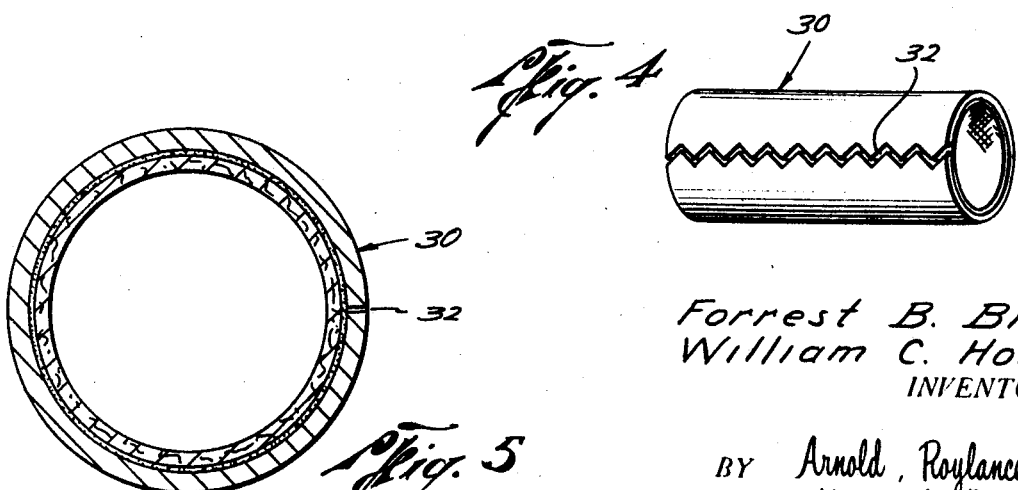
Fig. 4
Fig. 5
Forrest B. Bruch
William C. Hood
INVENTORS
BY Arnold, Roylance,
Kruger & Durkee
ATTORNEYS United States Patent Office 3,514,831
Patented June 2, 1970

ABSTRACT OF THE DISCLOSURE

Method is provided for bonding to a tubular sleeve of thin metal sheet, a fabric comprised of fibers of tetrafluoroethylene in one layer and fibers of glass and tetrafluoroethylene in another layer. Method includes rolling a flat sheet of metal to form tubular sleeve, placing adhesively coated fabric strip on cylindrical mandrel and positioning mandrel inside sleeve. Sleeve is compressed into contact with fabric strip whereupon the fabric is bonded to the inner surface of the sleeve. Assembly is then heated to set the bond.

Article is provided by the method summarized above.

BACKGROUND OF THE INVENTION

This invention relates to antifriction bearings and more specifically to generally cylindrical bearing members having durable, low-friction surfaces, and to a method for making such a bearing member.

It is well known in the design of bearing members that such members should have long life and high load carrying capacity. Further, it is important that the bearing surface be a low-friction surface which preferably requires no lubricant. A surface of a tetrafluoroethylene resin material has been found to satisfy these design criteria to yield a bearing surface which has many distinct and definite advantages when compared with the bearings of the prior art, and which is greatly superior to such prior art bearings in many contexts of use. As used in this application, the term "tetrafluoroethylene resins" refers to resins which contain tetrafluoroethylene as an essential or basic ingredient, whether or not the resin includes modifiers, extenders, colorants, or other additives, and whether or not the resin comprises a simple polymer or a copolymer. These resins are characterized by extreme chemical inertness, exceptional heat resistance, toughness over a wide range of temperatures, and excellent electrical properties. Although classified generally as thermoplastics, they do not melt and flow as do the conventional plastics of the class.

These tetrafluoroethylene resins are available in the market-place in various forms, including in the form of a woven fabric. An example of a particular resin is the polytetrafluoroethylene marketed by the E. I. du Pont de Nemours Co. under the trademark "Teflon." Teflon fabric is available which is woven entirely from fibers of polytetrafluoroethylene, and such fabrics which have been woven from a blend of polytetrafluoroethylene fibers and glass fibers (or cotton or various other fibers) are also available. This invention concerns method and article wherein the polytetrafluoroethylene-glass fiber fabric is used.

Because of their high heat resistance, mechanical properties and other characteristics, particularly at high temperatures, working with the tetrafluoroethylene resins requires the use of special techniques. It is because of these special techniques that must be employed, that significant difficulty is encountered and severe problems arise.

Bearings constructed entirely of tetrafluoroethylene resin, although they have their utility in some applications, are too expensive for common use. In the past, it has been found extremely difficult to manufacture a suitable bearing of other material having a bearing surface of tetrafluoroethylene resin. This difficulty arises not primarily because of the difficulty of bonding the tetrafluoroethylene resin material to other material, but instead because it is critical that the bearing surface be smooth and the diameter of the bearing surface be constant. Prior art methods have not been able to successfully produce a bearing not excessive in price having a smooth bearing surface of constant diameter.

This invention provides such a method, and by that method a superior bearing which is not so expensive to manufacture that it is available for use in many applications heretofore excluded for this general type of bearing.

While the invention is primarily directed to the bearing art, it is noted that portions of the invention are equally applicable to other contexts of use wherein it is desired to provide a smooth cylindrical surface of constant diameter, which surface will be essentially frictionless and provide high load carrying capacity and long life.

SUMMARY OF THE INVENTION

The invention provides a method for manufacturing a bearing or like member which has a cylindrical bore therethrough. The method comprises generally the provision of a flat sheet of metal, pretreatment of the metal sheet to enhance adhesion, and rolling the metal sheet to form a generally tubular member. The invention further comprises the provision of a sheet of fabric of a size convenient for fitting inside the tubular member, the fabric preferably being a fabric woven from a mixture of glass fibers and fibers of tetrafluoroethylene resin, wherein the fabric comprises two distinct layers, one of which is essentially all tetrafluoroethylene resin and the other is a mixture. A coat of primer adhesive is applied to the side of the fabric having the mixture of glass and tetrafluoroethylene resin fibers, and this coat is allowed to dry; the primer surface is then coated with a suitable adhesive such as an epoxy resin. A generally cylindrical mandrel is provided, the length of which is at least as long as the length of the bearing to be formed, and the diameter of which is just slightly larger than the diameter of the rolled metal. The fabric is then placed on the mandrel so that the side of the fabric which comprises essentially only tetrafluoroethylene resin fibers is adjacent the surface of the mandrel, and the mandrel is juxtaposed against the inner wall of the tubular member formed by rolling the metal sheet. The assembly is baked in an oven or the like at a temperature and for a period of time sufficient to form a bond between the surface of the metal piece and the fabric.

The resultant article has been found to be superior to bearings of this general nature existing in the prior art. It is not unduly expensive to manufacture, is durable and has a high load carrying capacity, provides an essentially frictionless surface and—very importantly—provides a smooth bearing surface of constant diameter.

BRIEF DESCRIPTION OF THE DRAWINGS

In order that the invention may be more clearly understood, it will be explained in terms of embodiments which are illustrated in the accompanying drawings which form a part of this specification and wherein:

FIG. 1 is a perspective view of a metal sheet employed in the method of this invention;

FIG. 2 is a side view of a mandrel and fabric strip employed in the method of this invention;

FIG. 3 is a view similar to FIG. 2 at a later stage in the method;

FIG. 4 is a pictorial view of a completed product formed in accordance with the invention; and, FIG. 5 is a cross-sectional view of the article shown in FIG. 4.

DESCRIPTION OF THE PREFERRED EMBODIMENT

In accordance with this embodiment of the invention, a flat segment of metal 10 of substantially rectilinear configuration having a width equal to the desired bearing circumference, and a length equal to the desired length of the bearing member, is provided. Longitudinal edges 12 and 14 are defined on each side of the sheet.

In this embodiment, these edges are serrated in a saw-tooth configuration, the configurations being such that the edge 14 is adapted to mate with the edge 12. This feature has been found to be very important in preventing relative longitudinal movement of the sides after the sheet is formed into the sleeve of the invention.

The flat sheet of metal 10 may be of any convenient thickness, but should be sufficiently strong to effectively form the bearing member. Advantageously, flat rolled stainless steel plate having a thickness of from about 0.015 in. to about 0.080 in. may be used.

One surface 16 of the metal sheet is pretreated in order to improve its adherence qualities. Such pretreatment may be accomplished for example, by sandblasting or etching, both of which are well known methods to those skilled in the art. The pretreated sheet is then rolled by any suitable method to form a generally tubular sleeve 18 (FIG. 3). In the generally tubular sleeve so formed, one edge 12 of the metal sheet is spaced from the other edge 14 to form an axial opening 26 which extends throughout the length of the member. The surface 16 is the inner surface of the sleeve.

A sheet of fabric 20 of a size convenient for fitting inside the tubular sleeve is provided. This fabric is preferably one which comprises two distinct layers, a first layer of which is made of fibers of tetrafluoroethylene resin, and a second layer of which is made from a mixture of glass fibers and fibers of tetrafluoroethylene resin in any desired composition, for example about 30% by weight of glass fibers and about 70% by weight tetrafluoroethylene resin fibers. Such fabrics are readily available in the marketplace. One example of a suitable fabric is Stem & Stern's T27-36 TFE fabric.

The fabric is desirably cut into segments, just slightly larger in length and width than the individual metal segments.

A coat of primer adhesive is applied to the surface of the second layer of the fabric, i.e., the layer having the mixture of fibers. This primer adhesive may be any adhesive suitable for the purpose. For example, a suitable epoxy adhesive may be employed. The primer coat is applied in a thin uniform layer (of, for example, 0.001 inch) onto the fabric surface. The primer coat is allowed to dry preferably by heating the material to a temperature of about 200° F.

A suitable adhesive is then applied tot he material in a uniform coat over the primer coat. Epoxy resins have been found advantageous for use as adhesives in this context. Specifically as one example of a suitable resin, "M-611" of PPG Industries may be used. The resin may desirably be applied to the fabric in a thickness of about 0.003 inch.

It is important that the adhesive be spread over the dried primer coat in a substantially uniform layer. This is true because it is critical that the bearings formed must be of constant diameter. It will be recognized that irregularities in the thickness of the adhesive coating will likely show up as irregularities in the diameter of the bearing. Hence the importance of this feature.

A mandrel 24 which is of generally cylindrical overall configuration is provided. The length of the mandrel is at least as great as the length of the bearing to be formed, and the diameter of the mandrel is approximately the same as the diameter of the bearing to be formed. It is often desired to bond fabric to a plurality of lengths of metal tubing at the same time. When this is desired, the mandrel will be much greater in length than the individual metal sheets.

The adhesively coated fabric is then wrapped around the mandrel so that the side which is not coated with adhesive is against the surface of the mandrel. The mandrel is then placed inside the tubular sleeve 18. The tubular member is then slightly compressed, as by hand or by use of clamping means, to move the two longitudinal edges of the tubular member together, and thereby to move the adhesively coated second layer of the fabric into contact with the inner surface of the tubular member. In this manner, the fabric is adhered to the surface of the tubular member continuously along both the length and the circumference of the tubular member.

In order to assure a firm bond between the fabric and metal member, the assembly is heated for a suitable period. For example, the assembly may be heated in an oven for about one hour at about 300° F. The mandrel is of course withdrawn to form the resultant article.

In the resultant article 30 the fabric is firmly adhered to the metal over the entire inner surface of the tubular member to form the bearing surface of substantially constant diameter. The bearing surface so formed, in addition to being of constant diameter, is also smooth, essentially frictionless, and has been found to have great load-carrying capacity.

In the article 30 seen in FIG. 5, it is noted that a small gap 32 is present between the edges 12 and 14 of the sleeve. This gap is desirable to provide tolerances for expansion of the metal in high temperature environments, etc.

Example I

A sheet of 28-gauge (0.015 inch thickness) flat rolled stainless steel was cut into segments measuring about 7.85 inches in width and about 4 inches in length. The longitudinal edges of one of the segments were serrated so that a saw-toothed pattern was cut into each edge, the patterns being such that one edge was adapted to mate with the other edge.

One side of the segment was pretreated by sandblasting.

A strip of T27-36 TFE fabric was provided and cut to a length of about 4½ inches and a width of about 8¼ inches. This strip was placed on a flat surface with the layer having the glass fibers therein exposed. This layer was coated to a thickness of about 0.001 inch over the entire strip with 602-2 (a PPG Industries' epoxy resin) primer. The strip was then heated in an oven at 200° F. for about one hour at which time the primer coat had dried and the strip was removed from the oven.

After cooling at room temperature for about 30 minutes, the strip was once again put onto a flat surface, the primer-coated side up, and M-611 (PPG epoxy) resin was applied over the entire strip to a uniform thickness of 0.0025 (±0.0005) inch by means of a metal spatula.

The coated strip of fabric was then wrapped, coated-side exposed, onto a 36 inch long mandrel which was made from a piece of aluminum tubing, 2.5 inches if outside diameter.

The segment of metal sheet was then rolled on a heavy metal roller with the pretreated surface adjacent the roller, to form a generally tubular sleeve having a length of 4 inches and a diameter of about 2.5 inches. The longitudinal saw-toothed edges were not brought together, however, and a distance of about ½ inch separated one of these edges from the other. The pretreated surface formed the inner surface of the sleeve.

The mandrel was then brought inside the generally tubular metal sleeve and the midpoint of the fabric visually aligned with the midpoint of the sleeve. A large hose clamp was then placed over the sleeve and tightened so that the saw-toothed longitudinal edges were brought together and the inner surface of the sleeve was brought into contact with the adhesive coating on the fabric strip.

The assembly was then placed in an oven and heated at 300° F. for one hour, to achieve a permanent bond between adhesive and metal. It was then removed from the oven and allowed to cool at room temperature for 30 minutes, after which time it was submersed in cool water.

Using a sharp blade, the excess fabric was trimmed from the ends of the sleeve and along the longitudinally overlapping portion, it was obserbed that the longitudinal saw-toothed edges of the sleeve were separated by a small gap of about $\frac{1}{32}$ inch.

The resultant sleeve, 4 inches in length and 2.5 inches in inside diameter, was used in a journal bearing and was found to provide excellent load carrying capacity at very low friction. When calipered, the diameter was found to be substantially constant.

Example II

Example I was repeated, except that a stainless steel segment having the following dimensions was employed:

thickness, 0.080 inch (14 gauge)
length, 12 inches
width, 25.13 inches (for bearing diameter of 8 inches)

When the fabric-coated sleeve was employed in a journal bearing, exceptional results were obtained. A relatively frictionless surface gave good load carrying capacity, and when calipered the diameter was found to be substantially constant.

While the invention has been described in terms of certain preferred embodiments and examples, it will be readily recognized by those skilled in the art that various modifications may be made in the methods of these examples without departing from the scope of the invention, which is defined by the following claims.

What is claimed is:

1. A method for bonding a sheet of material to a flat metal sheet in order to form a tubular member having an internal low-friction surface which is smooth and of substantially constant diameter, comprising:
   providing a flat metal sheet;
   rolling said sheet to form a generally tubular member;
   providing a sheet of fabric having
      a first layer of fibers of tetrafluoroethylene resin, and
      a second layer of a mixture of glass fibers and fibers of tetrafluoroethylene resin;
   applying an adhesive in a substantially uniform coat onto the surface of said second layer of said fabric;
   providing a mandrel of generally cylindrical configuration;
   wrapping said sheet of fabric onto said mandrel in such fashion that the surface of the mandrel is in contact with said first layer of the fabric;
   positioning said mandrel inside said tubular member so that the adhesive coating on said second layer of the fabric is adjacent the inner surface of said tubular member;
   pressing said tubular member against said fabric to an extent sufficient to contact said fabric with the inner surface of said tubular member, thereby adhering said fabric to said inner surface of the tubular member; and,
   heating said tubular member and fabric for a period of time sufficient to form a strong bond between said fabric and the metal sheet.

2. The method according to claim 1, wherein said adhesive is an epoxy resin.

3. The method according to claim 1, wherein said tubular member and fabric are heated at about 300° F.

4. The method according to claim 1, wherein a primer adhesive is applied to said second layer of said fabric before application of the adhesive.

5. The method according to claim 1, wherein said metal sheet is flat steel having a thickness of about 0.015 to 0.080 inch.

6. The method according to claim 1, wherein said metal sheet is pretreated by sandblasting or etching for enhancing adhesion to said fabric.

7. The method according to claim 1, wherein longitudinal edges of said metal sheet are serrated in sawtooth configuration, one of said edges being adapted to move into mating engagement with the other edge.

8. A method for bonding a sheet of material to a flat metal sheet in order to form a tubular member having an internal low-friction surface which is smooth and of substantially constant diameter, suitable for use as a bearing, comprising:
   providing a flat metal sheet of generally rectilinear configuration having a first longitudinal edge and a second longitudinal edge;
   pretreating one side of said sheet to enhance the adhesiveness of the metal with a liquid adhesive;
   rolling said sheet to form a generally tubular sleeve wherein said first longitudinal edge is spaced from the second said longitudinal edge to form an axial separation throughout the length of said tubular sleeve;
   providing a sheet of fabric having
      a first layer of fibers of tetrafluoroethylene resin, and
      a second layer of a mixture of glass fibers and fibers of tetrafluoroethylene resin;
   applying an adhesive in a substantially uniform coat onto the surface of said second layer of said fabric;
   providing a mandrel of generally cylindrical configuration;
   wrapping said sheet of fabric onto said mandrel in such fashion that the surface of the mandrel is in contact with said first layer of the fabric;
   positioning said mandrel inside said tubular sleeve so that the adhesive coating on said second layer of the fabric is adjacent the inner surface of said tubular sleeve;
   pressing said tubular sleeve against said fabric to an extent sufficient to join said first longitudinal edge to said second longitudinal edge and to contact said fabric with the inner surface of said tubular sleeve substantially throughout the length of said tubular sleeve, thereby adhering said fabric to said inner surface of said sleeve; and
   heating said tubular sleeve and fabric at a sufficient temperature and for a period of time sufficient to form a strong bond between said fabric and the metal tubular sleeve.

9. The method according to claim 8, wherein each said first longitudinal edge and said second longitudinal edge are serrated to provide for mating engagement of said edges one against the other.

References Cited

UNITED STATES PATENTS 3,047,934   8/1962   Magner.
3,238,601   3/1966   White

THOMAS H. EAGER, Primary Examiner

U.S. Cl. X.R.

156—272